(No Model.)

J. S. ROOKER.
BEE FEEDER.

No. 562,853. Patented June 30, 1896.

WITNESSES:
H. E. Nealy
J. A. Walsh

INVENTOR
John S. Rooker,
BY Chester Bradford,
ATTORNEY.

UNITED STATES PATENT OFFICE.

JOHN S. ROOKER, OF MARTINSVILLE, INDIANA.

BEE-FEEDER.

SPECIFICATION forming part of Letters Patent No. 562,853, dated June 30, 1896.

Application filed June 15, 1895. Serial No. 552,926. (No model.)

*To all whom it may concern:*

Be it known that I, JOHN S. ROOKER, a citizen of the United States, residing at Martinsville, in the county of Morgan and State of Indiana, have invented certain new and useful Improvements in Bee-Feeders, of which the following is a specification.

As is well known, there are seasons and occasions when it is desirable to supply saccharine matter to bees in excess of the amount they are able to gather from blossoms, in order that the bees may not only be assured from starvation through the winter, but also to give them an easily accessible and ample supply of food early in the honey-gathering season, or rather before such season begins, thus securing that the young brood shall be well taken care of and given an early start, so as to be prepared to enter into the work of regularly gathering honey earlier in the season than they otherwise could.

The object of my said invention is to produce an efficient and easily-operated bee-feeder; and it consists in the peculiar construction and arrangement of such a feeder, whereby various advantages are secured, as will be hereinafter more particularly described and claimed.

Figure 1:
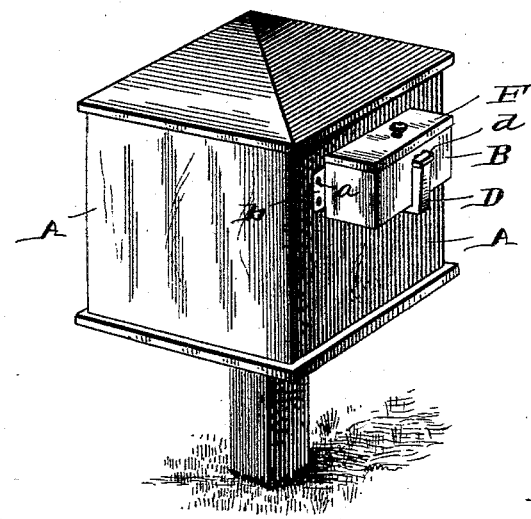
Figure 2:
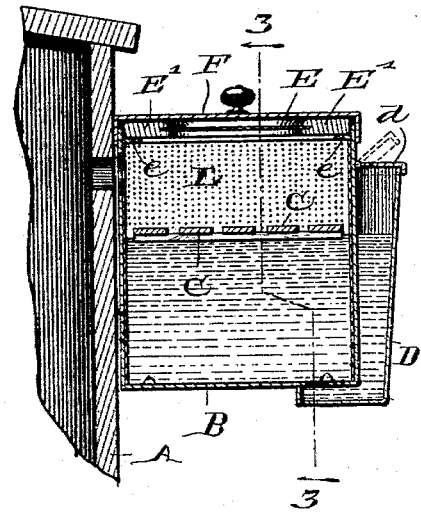
Figure 3:
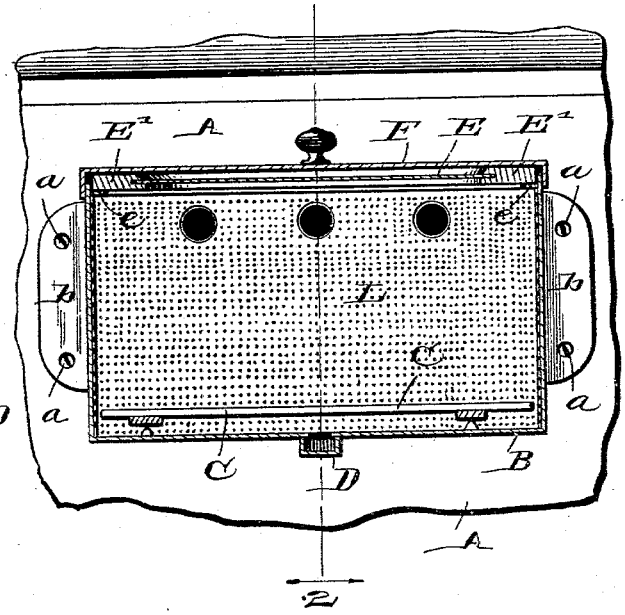

Referring to the accompanying drawings, which are made a part hereof, and on which similar letters of reference indicate similar parts, Figure 1 is a perspective view of a bee-hive provided with one of my improved feeders attached thereto in the position it most commonly occupies when in use; Fig. 2, a transverse central sectional view through the feeder and an immediately adjacent fragment of the hive on the dotted line 2 2 in Fig. 3 and showing the feeder partially filled with liquid, with the buoyant false floor or raft C floating thereon; and Fig. 3, a longitudinal sectional view through the feeder as seen from the dotted line 3 3 in Fig. 2, except that the feeder-tank is shown empty, with the floor C resting on the bottom.

This invention is adapted to be applied to any form or construction of hives desired. That shown is a common box-hive A, and the feeder is shown as secured thereto by ordinary screws. Said feeder consists of an exterior casing B, which is fluid-tight, except as hereinafter stated, and is preferably formed from sheet metal, commonly galvanized iron. An interior lining L is provided for the sides and ends, formed either of sheet metal filled with fine perforations, as shown, or of finely-woven wire-netting. The purpose of this lining is to give the bees a good foothold, so that they can, even when heavily loaded, readily climb up and along the sides as occasion requires. This feeder may be of any form desired. A convenient form is that shown, in which the casing or tank B is substantially an oblong rectangular box, one of its longer sides being attached to the hive. The means of attachment are commonly the ears *b*, through which screws *a* may be inserted, as shown in Fig. 1.

Communication is established between the hive and the tank B of the feeder by means of perforations, generally of considerable size, which extend through the wall of the hive and the wall of the feeder, and register when the parts are assembled, as is shown in the drawings. The openings through the sides of the hive are preferably not quite as large as those through the sides of the feeder, so that the bees in passing in and out will not come against the sharp edges of the metal where these openings are cut. Three such openings are formed in the feeder and hive illustrated, as shown most plainly in Fig. 3, where the solid black represents the openings through the hive, and the surrounding rings the openings through the side of the feeder-tank.

Within the tank B of the feeder is a buoyant raft or false floor C, made from wood or some other material adapted to float on the liquid which is to be placed therein. It is desirable that this floating or false floor should not be capable of absorbing water, and I find that this result can be reached by boiling the pieces of wood of which said false floor is composed in paraffin or other equivalent substance, and thus filling the pores of the wood and preventing such absorption.

On the outside of the tank B of the feeder is a conduit D, which leads from a point above the upper level of the fluid when placed in the feeder to below the tank B, thence under said tank, through the bottom of which a perforation is formed which communicates therewith. By this arrangement the saccharine fluid employed can be poured in through this conduit, and will flow in at the bottom below the raft or floating false floor, so that the bees will not be disturbed by the operation of replenishing the feeder.

The top of the feeder is preferably composed of two removable members, the inner one of which is either entirely of glass or of glass set in a wooden or other frame. I have shown it as a glass E in a frame or sash E'. When in place, this rests on a ledge $e$, formed on the inside of the casing B near the top. It will be observed that this closes the feeder against any possibility of escape on the part of the bees, and at the same time permits observation of the interior, so that the apiarist may ascertain its condition as to quantity of fluid or cleanliness or otherwise.

The second or outer cover F has its edges flanged down all around to serve as a roof, and when in place completely covers and protects the structure, so that when the cover $d$ of the conduit D is shut down nothing can enter the feeder from the outside, and said feeder is thus perfectly protected from the admission of rain or other matter, or the intrusion of insects, the only openings being those left for communication between the feeder and the hive.

In applying my improved feeder to a hive I first place it against the hive, at the point where it is desired to fix it, having first removed the covers, and then mark the openings. Then with a bit or auger somewhat smaller than the openings in the back of the feeder I bore the holes, closing each hole with a cork as the boring progresses, so as to prevent the escape of the bees until all is ready. After these holes are bored and corked I place the feeder in position, and secure it there by means of the screws $a$. I then remove the corks and place on the covers E and F, and the apparatus is in condition for use. The saccharine fluid which I prefer to use I make by boiling granulated sugar, using sufficient water to make a very thin syrup. This I introduce through the conduit into the tank, and, as the fluid rises therein, it carries the buoyant raft-like false floor C on its surface. The feeder may be filled to any point below the openings leading to the hive desired, and after being filled needs no further attention until the supply is consumed. Whenever, from long use or otherwise, the feeder becomes foul, the openings leading to the hive can be stopped, and the feeder removed and cleansed, after which it may be replaced, as will be readily understood.

Having thus fully described my said invention, what I claim as new, and desire to secure by Letters Patent, is—

1. The combination, in a bee-feeder, of an outer casing secured to the side of the beehive, there being apertures in said side leading from said hive to said feeder, a lining for the sides of said feeder composed of perforated or reticulated material to serve as a ladder for the bees, a floating false bottom in said feeder, a double top thereto consisting of a removable transparent cover and a roof-like imperforate cover above the same, and means for introducing the food supply, substantially as set forth.

2. In a bee-feeder, the combination, of the outer casing secured to the hive, there being apertures in the side of said hive leading to within said casing, a lining for the sides of the feeder of material adapted to serve as a ladder for the bees, a suitable cover, and a conduit on the outside of said feeder leading from a point near its top down its side and under its bottom, where it communicates therewith through the bottom of the feeder under the floating false bottom, the top of conduit being formed so that fluid may be conveniently poured therein, substantially as set forth.

In witness whereof I have hereunto set my hand and seal, at Indianapolis, Indiana, this 30th day of June, A. D. 1895.

JOHN S. ROOKER. [L. S.]

Witnesses:
 CHESTER BRADFORD,
 JAMES A. WALSH.